United States Patent [19]
Schaefer et al.

[11] 3,777,194
[45] Dec. 4, 1973

[54] SUBMERSIBLE MOTOR WITH PROTECTIVE END BELLS

[75] Inventors: Edward J. Schaefer; Alfred F. Refice, both of Bluffton, Ind.

[73] Assignee: Franklin Electric Co., Bluffton, Ind.

[22] Filed: Oct. 6, 1971

[21] Appl. No.: 187,012

[52] U.S. Cl. .................. 310/87, 310/89, 310/89
[51] Int. Cl. ............................................ H02k 5/10
[58] Field of Search ....................... 310/87–89, 310/85, 42, 45, 157, 67, 71

[56] References Cited
UNITED STATES PATENTS

| | | | |
|---|---|---|---|
| 2,654,848 | 10/1953 | Schaefer | 310/87 X |
| 2,829,288 | 4/1958 | Schaefer | 310/87 |
| 2,698,911 | 1/1955 | Schaefer | 310/87 X |
| 3,319,093 | 5/1967 | Abdul | 310/87 X |
| 2,610,988 | 9/1952 | Wiese | 310/45 X |
| 3,308,317 | 3/1967 | Allenbaugh | 310/88 |
| 3,050,645 | 8/1962 | Redding, Jr. | 310/87 |
| 2,944,297 | 7/1960 | Maynard | 310/87 X |
| 3,604,964 | 9/1971 | Conrad | 310/87 X |
| 1,925,334 | 9/1933 | Mendenhall et al. | 310/87 |

*Primary Examiner*—V. D. Miller
*Assistant Examiner*—Mark O. Budd
*Attorney*—Lowell C. Noyes et al.

[57] ABSTRACT

This disclosure deals with an electric motor designed for use in a corrosive liquid. The heavy load supporting parts at the ends of the motor are made of a strong but corrodable metal, and these parts are protected against corrosion by covers of a corrosion-resistant material. Holes are formed in one of the end parts and its cover to receive a power input connector, and a corrosion-resistant sleeve is mounted in the holes and around the connector to protect this end part against corrosion and also to anchor a plug of the connector. One cover has aligning portions formed thereon which are adapted to fit mating aligning portions of a mechanism such as a pump to be driven by the motor. The other cover both protects the associated end part against corrosion and serves to support a pressure-equalizing device of the motor.

15 Claims, 6 Drawing Figures

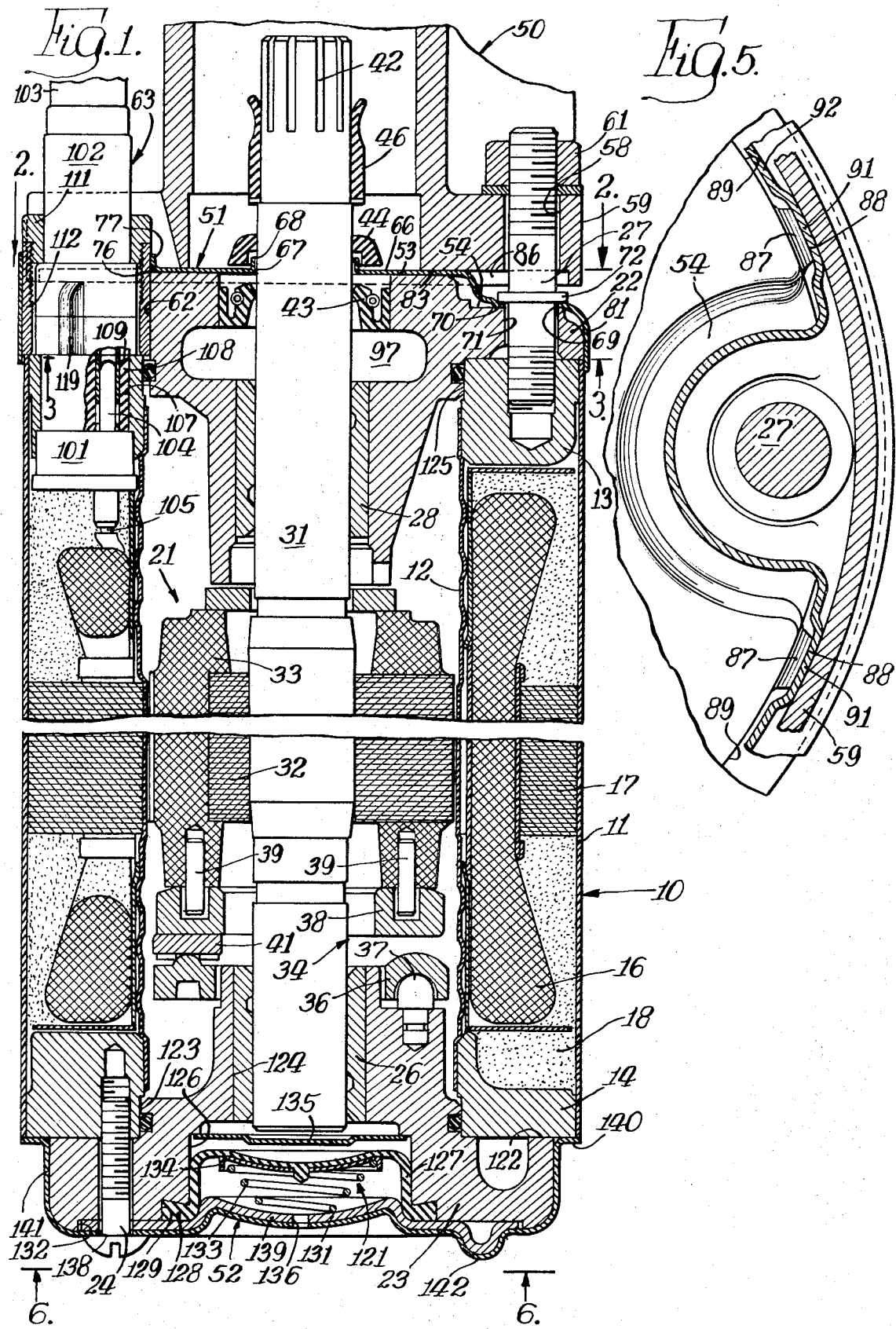

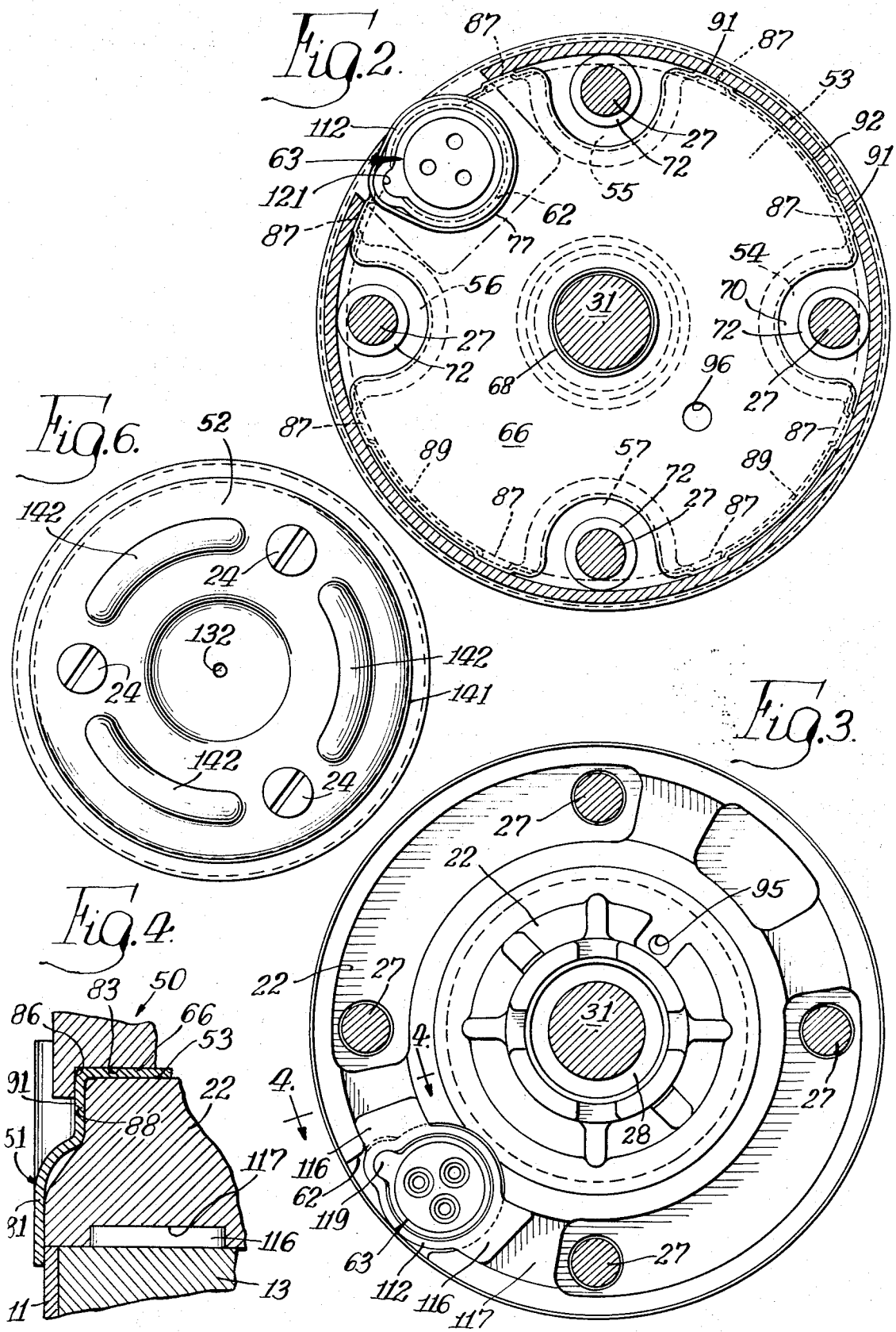

SUBMERSIBLE MOTOR WITH PROTECTIVE END BELLS

Electric motors of the character designed to be submerged in, for example, a water well and drive a pump are subject to corrosion by the well liquid. Prior art submersible motors have included an outer cylindrical shell made of a corrosion-resistant material such as stainless steel which protects the stator laminations and windings. The end bells of such a motor should be constructed of a rather strong material since they must rotatably support the rotor, and it has been customary in the past to manufacture such end bells of cast iron. A disadvantage of using cast iron is, of course, that it is corrodable. It would be possible to make the end bells of a corrosion-resistant material such as stainless steel or brass but such materials are excessively costly, and therefore not commercially feasible. Further, a material such as stainless steel is not easily fabricated. End bells have been made of a corrosion-resistant plastic material reinforced with fiberglass but again difficulties have been encountered with such material. The principal difficulty is that the plastic material is not a good heat conductor and problems have occurred where it is necessary for motor heat to be dissipated through the end bells. It would, of course, be possible to make the end bells of a strong but corrodable material such as cast iron and plate or coat the end bells with a corrosion-resistant coating, but such plating or coating has the disadvantage that it can be easily penetrated by scratching either before or during installation of the motor. While it may be possible to make the plating or coating of a sufficient thickness to avoid this difficulty, this would be an expensive undertaking.

It is therefore an object of the present invention to overcome the foregoing disadvantages by providing a submersible electric motor and a method of manufacturing such a motor wherein the entire exterior of the motor is a corrosion-resistant material.

An electric motor according to the invention comprises a stator including a cylindrical outer shell made of a corrosion-resistant material, preferably metal, an end bell secured to each end of said stator, a rotor rotatably supported by said end bells, the end bells being made of a strong but corrodable material, and a cover made of a corrosion-resistant metal over each of said end bells, each of said covers substantially covering the associated end bell and extending to the adjacent end portion of the shell.

Where the motor is designed to drive a mechanism such as a pump, the power output shaft of the motor extends through aligned openings in one end bell and the associated cover, and the shaft is adapted to be connected to drive the impeller of the pump. This cover has a plurality of spaced apart aligning portions adapted to mate with aligning portions of the pump to accurately locate the pump and hence the impeller relative to the motor shaft.

Electrical power is connected to the motor by a connector which extends through aligned holes formed in one end bell and the associated cover. A sleeve made of a corrosion-resistant metal is mounted in these holes and around the connector and protects the wall of the hole in the end bell against corrosion and anchors a plug of the connector. The cover at the end of the motor opposite the power output shaft further serves to support an arrangement for equalizing the pressure inside the motor with the ambient pressure.

Further objects and advantages of the invention will be apparent from the following detailed description taken in conjunction with the accompanying figures of the drawings, in which:

FIG. 1 is a fragmentary longitudinal sectional view of an electric motor embodying the invention;

FIG. 2 is a transverse sectional view taken on the line 2—2 of FIG. 1;

FIG. 3 is a transverse sectional view taken on the line 3—3 of FIG. 1;

FIG. 4 is an enlarged fragmentary sectional view taken on the line 4—4 of FIG. 3;

FIG. 5 is an enlarged fragmentary sectional view of a portion of the motor; and

FIG. 6 is a view on a reduced scale taken on the line 6—6 of FIG. 1.

The electric motor shown in the drawings comprises a stator 10 including a cylindrical outer tubular shell 11, a tubular inner liner 12 which is positioned concentrically within the outer shell 11, and upper and lower end rings 13 and 14, respectively. The end rings 13 and 14 are positioned between the end portions of the shell 11 and the liner 12 and hermetically sealed thereto as by welding to form a stator enclosure. Stator windings 16 and stator laminations 17 are mounted within the stator enclosure, and a potting compound 18 fills the stator enclosure around the windings 16 and the laminations 17.

The motor 10 further includes a rotor 21 which is rotatably supported on the stator 10 by upper and lower end bells 22 and 23. The lower end bell 23 is positioned against the underside of the lower end ring 14 and is secured thereto as by screws 24, and a lower sleeve bearing 26 is mounted in the end bell 23. the upper end bell 22 is similarly secured to the upper surface of the upper end ring 13 as by mounting studs 27, the bell 22 supporting an upper sleeve bearing 28. The rotor 21 includes a rotor or power output shaft 31 which is rotatably supported by the two bearings 26 and 28. Rotor laminations 32 are secured to the shaft 31 in any suitable manner, and a cast squirrel cage-type winding 33 is fastened to the laminations 32.

To support the weight of the rotor and any axially downwardly directed thrust on the rotor, a thrust bearing 34 is provided comprising a pivotally mounted nonrotating ring 36 which is mounted by pivots 37 on the lower end bell 23, and a rotating ring 38 which is fastened to the lower end of the windings 33 by pins 39. Slippers 41 supported by the ring 36 engage the underside of the rotating ring 38 and support the weight of the rotor and any thrust thereon.

The rotor shaft 31 extends upwardly out of the upper end bell 22 and has splines 42 formed thereon which are adapted to be coupled with a mechanism, such as a pump, to be driven. A seal 43 is mounted on the upper end bell 22 around the rotating shaft 31 to seal the interior of the motor from the ambient fluid. The interior of the motor is filled with a liquid which lubricates the bearings and cools the motor. A sand slinger 44 is fastened to and rotates with the shaft 31 just above the upper end bell 22 to prevent sand from settling around the seal 43, and a spline protector 46 is fastened to the shaft 31 above the sand slinger 44.

It will be apparent that the upper and lower end bells 22 and 23 and the upper and lower end rings 13 and 14 should be made of a relatively strong material since they support the weight of the motor and the stresses occurring during operation, and it is advantageous to use a strong, inexpensively and easily machined material such as cast iron or die cast aluminum for these parts. However, such a material is readily corroded by the well liquid, and to protect these parts, they are covered or clad with a corrosion-resistant material such as stainless steel. The outer shell 11 of course forms part of this cladding. Additional parts of the cladding include an upper cover 51 which covers the top side of the upper end bell 22 and overlaps the upper end portion of the shell 11, and a lower cover 52 which covers the lower end bell 23 and underlies the lower edge of the shell 11 and is in contact therewith.

With regard first to the upper cover 51, the upper end bell 22 and the top cover 51 are shaped to fit an adaptor 50 (FIG. 1) of a mechanism (not shown) such as a pump to be driven to align the latter. Certain dimensions of the parts are held to close tolerances so that the shaft 31 will make an accurate connection with the drive shaft (not shown) of the mechanism being driven.

The upper surface of the end bell 22 is flat over most of its area as indicated at 53 (FIGS. 1, 2 and 4), there being, however, four counterbores or recesses 54 to 57 around the four studs 27. As previously mentioned, the studs 27 connect the end bell 22 to the ring 13, and the upper ends of the studs 27 are used to fasten the motor to the adaptor 50. Holes 58 are formed in a radially extending flange 59 of the adaptor for the studs 27, and nuts 61 secure the adaptor 50 to the studs. In addition, the end bell 22 is recessed or cut out as indicated at 62 (FIGS. 1, 2 and 3) to receive an electrical connector 63 as will be described in more detail hereinafter.

The top cover 51 has a flat central portion indicated at 66 which fits tightly against the flat upper surface 53 of the end bell 22. A hole 67 (FIG. 1) is formed centrally of the cover 51 for the shaft 31 and the edge of the hole 67 is preferably flared upwardly to the sand slinger 44 as indicated at 68.

The cover 53 is pressed into the four counterbores or recesses 54 through 57 and is pressed flat against the upper surfaces of the counterbores as indicated at 70 in FIGS. 1 and 2. A hole 69 is formed in the cover 53 for each of the studs 27, and each stud 27 extends through the hole 69 through an aligned hole 71 formed in the upper end bell 22 and is threaded in the end ring 13. A flange 72 midway in the length of the stud 27 presses the cover 53 and the upper end bell 22 tightly against the upper end surface of the end ring 13 when the stud 27 is threaded into the end ring 13. At the recess 62 for the connector 63, the cover 53 has another hole 76 formed therein and the edge of this hole is also flared upwardly as indicated at 77, and the flared edge of the hole 76 extends adjacent the outside of the electrical connector 63 as will be described.

As shown in FIGS. 1 and 4, the upper edge of the outer shell 11 is flush with the upper surface of the upper end ring 13. The outer periphery of the end bell 22 extends radially beyond the outer surface of the end ring 13 and overlies the edge of the shell 11, the outer peripheral surface of the end bell 22 being substantially flush with the outer surface of the shell 11. The outer portion of the cover 51 around its entire circumference curves downwardly to form a flange 81, and the flange extends across and fits tightly against the outer surface of the end bell 22. Further, the flange 81 of the cover 53 overlaps the upper end portion of the shell 11 and fits tightly against the shell 11, thus enclosing the end bell 22.

As shown in FIG. 1, the bottom surface, indicated by the numeral 83, of the adaptor 50 is machined flat and this undersurface 83 fits on the top surface of the flat area 66 of the cover 53. When the nuts 61 are tightened on the studs 27, the surface 83 is pressed tightly against the cover 53.

It is necessary to accurately align the power input or drive shaft (not shown) of the mechanism driven by the motor with the rotor shaft 31 for proper operation of the motor 10 and the mechanism, and this is accomplished by forming an accurately machined circular aligning recess 86 (FIGS. 1 and 4) in the bottom surface 83 of the adaptor 50. An accurately located aligning rabbet is formed on the upper end of the motor, which mates with the recess 86 and thus accurately locates the adaptor 52 on the motor 10. In prior art motors, the aligning rabbet of the motor is machined on the upper surface of the end bell 22, and this rabbet fits into the recess 86 of the adaptor 52.

In accordance with the present invention, an accurately formed rabbet is provided on the cover 51 which mates with the recess 86, and aligning projections on the end bell 22 accurately locate the cover 51. With particular reference to FIGS. 2 and 5, eight aligning points or radial projections 87 are formed on the outer periphery near the upper surface of the end bell 22, and the outer surfaces 88 of the projections 87 are accurately machined to obtain a given dimension across the diameter of two oppositely disposed projections, which is undersized relative to the diameter of the recess 86. As shown in FIG. 2, one of the projections 87 is located on each side of each recess 54 to 57, and each surface 88 has a relatively short arcuate dimension. The portions 89 of the end bell 22 between the projections 87 are preferably recessed as shown in FIG. 2.

The downwardly curved outer flange 81 of the cover 53 extends over and is pressed tightly against the surfaces 88 of the projections 87 as indicated by the aligning portions 91 in FIGS. 4 and 5. At the recesses 89 of the end bell 22, the outer periphery of the cover 53 is also deformed inwardly as indicated at 92, the portions 92 thus forming a smaller diameter than the aligning portions 91 of the cover 53.

In accordance with the present invention, the outer diameter measured across the cover 51 at the outer surface of opposite aligning portions 91 is held to very close tolerances, and this is accomplished by ironing or drawing the portions 91 to a certain thickness in a press. Since the standards for the rabbet are known, the over-all rabbet diameter formed by the outer surfaces of the portions 91 is obtained by first machining the projections 87 to an undersized dimension and then ironing the portions 91 of the cover 51 to an accurately controlled thickness. The diameter of the end bell 22 at the aligning projections 87, plus twice the thickness of the ironed portions 91 is equal to the required over-all diameter of the aligning rabbet.

In manufacturing such a motor, the end bell 22 is cast from a strong but corrodable material such as cast iron with the diameter across the aligning projections 87 somewhat greater than required. The end bell 22 is then machined, as by grinding or turning in a lathe, to obtain an accurately controlled diameter at the projections 87. The cover 51 is formed from sheet metal which is corrosion resistant, such as stainless steel or brass. A circular piece of the sheet metal is placed in a press to form the flat area 66 and the downwardly turned outer flange 81. The holes for the studs 27, the electrical connector 63 and the shaft 31 are formed as by a punching operation. After the pressing and punching operations have been performed, the cover 51 is placed in dies which iron or draw the aligning portions 91 to reduce its thickness to that required. Of, course, sheet metal is chosen having an initial thickness greater than the final thickness necessary. The drawing operation also makes the inner diameter of the portions 91 approximately equal to the diameter across the surfaces 88. Since the aligning portions 91 are formed, in accordance with an important aspect of this invention, by an ironing process, it is important that the portions are circumferentially spaced apart and are circumferentially short. This is true because an ironing process is a practical impossibility where the portion to be shaped is relatively long and continuous. Thus, by providing a relatively few, spaced apart and circumferentially short portions 91, a practical and economical ironing process may be utilized. After the ironing or drawing process is completed, and the other motor parts have been assembled, the cover 51 is placed on top of the end bell 22 with the portions 91 fitting tightly against the outer surfaces 88 of the projections 87, and the studs 27 are fastened. The adaptor 50 is positioned on top of the cover 51 with the outer surfaces of the portions 91 fitting tightly within the recess 86 of the adaptor 50, thus obtaining an accurately controlled alignment of the adaptor 50, the end bell 22 and the rotor shaft 31.

With reference to FIG. 2, another hole 96 is formed in the cover 51, this hole being in alignment with another hole 95 (FIG. 3) formed in the end bell 22. The hole in the end bell 22 leads from its upper surface to a space 97 (FIG. 1) in the end bell between the bearing 28 and the seal 43. A filter check valve device (not shown) is secured in the hole 95, this device permitting flow of ambient liquid into the interior of the motor but not the reverse flow. Such flow of liquid into the motor interior is necessary to replace any of the motor liquid lost through the seal 43.

The electrical connector 63 is a plug and socket type including a socket part 101 (FIG. 1) which is mounted in the stator 10, and a plug part 102 which is fastened to the end of a power cable 103. The socket part 101 includes a plurality of prongs 104 which are electrically connected by wires 105 to the stator windings 16, and the socket part 101 is fastened in a hole 107 formed in the upper end ring 13. The plug part 102 includes a flexible insulating bushing 108 which extends into the socket part 101 and has tubular conductor parts 109 which fit over the respective prongs 104 and make electrical connection therewith. The tubular conductors 109 are electrically connected to a power supply by the cable 103. A threaded retaining nut 111 which is telescoped over the end of the plug part 102 is adapted to be threaded into an anchoring part or connector sleeve 112. The anchoring part 112 is an important feature of the present invention and fits in the hole 76 formed in the cover 51 and in the opening 62 formed in the end bell 22. The anchoring part 112 is a tubular sleeve having threads (FIG. 1) formed on its inner surface, these threads mating with the threads of the retaining nut 111. At the lower end of the anchoring part 112 are formed two out-turned flanges or wings 116 (FIG. 3) which fit in a circular groove 117 (FIGS. 3 and 4) formed in the under-surface of the end bell 22. The flanges 116 have the same curvature as the groove 117 and the flanges 116 fit tightly into the groove 117 and prevent the anchoring part 112 from turning when the retaining nut 111 is threaded into it. Further, the flanges 116 serve to align the plug part 102 relative to the prongs 104 of the socket part 101 because the part 112 has only one angular position where the wings 116 fit in the groove 117. An aligning boss 119 (FIG. 3) is formed on the bushing 108 and the anchoring part 112 has an aligning groove 121 (FIG. 2) formed therein, and the aligning boss 119 is designed to slide in the groove 121 during assembly of the connector 63. Since the angular orientation of the groove 121 relative to the prongs 104 is determined and the angular orientation of the boss 119 relative to the tubular conductors 109 is also determined, correct electrical connections are made to the motor windings.

As shown in FIGS. 1, 2 and 3, the opening 62 in the end bell 13 extends to the outer periphery of the end bell and forms a generally U-shaped cavity. The outer flange 81 of the cover 51 extends across the open side of the opening 62, and the part 112 fits in the opening 62 and is enclosed by the cover 51. The present construction is advantageous in that the radius of the cover 51 is uniform, there being no radial bulges or offsets. This is important in a motor designed to fit in a small-diameter well.

While liquid tight seals may be provided at the openings 67, 69, 76 and 96 in the cover 51, seals are not necessary. Also, it is not necessary to provide a liquid tight seal between the cover and the end portion of the shell 11. Since no seals are provided, ambient liquid may enter the space between the cover 51 and the upper surface of the end bell 22, but such liquid will not pose a corrosion problem because such liqud does not circulate in this space. It has been found by experience that where a corrosive liquid does not circulate freely around a corrodable surface, little or no corrosion occurs. Consequently, even though it is possible to provide liquid-tight seals at the openings and edges in the cover 51, such seals are not necessary to protect the end bell 22 and the interior wall of the recess 62 from corrosion. The part 112 fits closely against the wall of the opening 62 and protects it from corrosion for a similar reason.

With reference to FIGS. 1 and 6, the bottom cover 52 serves both to cover the under surface of the lower end bell 23 and also to support a pressure equalizing mechanism indicated generally by the reference numeral 121. The lower end bell 23 fits tightly against the under surface of the lower end ring 14, the abutting surfaces being indicated generally by the reference numeral 122. Accurately machined surfaces 123 on the lower end ring 14 and the lower end bell 23 precisely locate the lower end bell 23 on the end ring 14, and similarly located surfaces 125 precisely locate the upper end bell 22 on the upper end ring 13. The lower end bell 23 supports the sleeve bearing 26 in a central opening 124, in the end bell and the opening 124 is enlarged below the bearing 26 in the area indicated by the reference numeral 126 to receive the pressure equalizing device 121. This device 121 includes a circular flexible diaphragm 126 which extends across the opening 126 and has its edge 128 located in a counterbore 129 of the opening 126. A relatively thick plate 131, which may be made of a corrosion resistant material, extends across the under side of the opening 126 and fits in a circular groove 132 formed in the bottom surface of the end bell 23, the plate 131 holding the edge 128 of the diaphragm 127 firmly in the groove 129 in sealed relation. A compression spring 133 is positioned between the plate 131 and the central area of the diaphragm 127 and tends to move the central area of the diaphragm upwardly. To prevent the spring 133 from damaging the diaphragm 127, a metal disk 134 is preferably provided between the spring 133 and the diaphragm 127. The central area of the plate 131 may be dished in the area indicated by the numeral 139. A disk 135 is also preferably provided between the diaphragm 127 and the lower end of the shaft 31.

The bottom cover 52 extends across the underside of the plate 131 and the lower end bell 23, and it conforms to the shape of these parts. Aligned holes 136 are formed centrally of the plate 131 and the cover 52 and permit ambient liquid to flow into the interior space between the plate 131 and the underside of the diaphragm 127. Thus, the diaphragm 134 is able to flex and equalize the liquid pressure inside and outside of the motor.

The lower end bell is secured to the lower end ring 13 by the screws 24 as previously explained, and the screws 24 also serve to secure the bottom cover 52 to the lower end bell 23. To this end, a hole 138 is formed in the cover 52 for each screw 124.

As shown in FIG. 1, the lower end ring and the lower end bell have the radially extending adjoining surfaces 122, but the peripheral surface of the end bell 23 is radially less than that of the end ring 14. Further, the lower edge of the shell 11 is flush with the lower surface of the end ring 14 and is of course radially displaced from the radially outer surface of the end bell 23. The outer flange portion 141 of the lower cover 52 curves upwardly around the outer periphery of the end bell 23 and then the outer edge portion 140 is bent radially outwardly and overlaps the lower edge of the shell 11. When the screws 24 are tightened in place, the edge portion 140 of the cover 52 is pressed tightly against the lower edge of the shell 11, and the inherent spring of the cover 52 enables a close fit between these parts without the necessity of shaping the parts to close tolerances. Like the upper cover 51, the lower cover 52 may be formed by punching and pressing operations. If desired, downwardly extending feet 142 may be formed on the plate 139 and the cover 52 to support the motor during storage, for example.

From the foregoing it will be apparent that a novel and useful submersible motor and a method of fabricating the same have been provided. The entire exterior of the motor is enclosed by a noncorrodable cover or cladding including the shell 11, the two covers 51 and 52, and the anchoring part 112. Accurately formed aligning surfaces are formed on the upper cover, and by the method of this invention the dimensions are held to close tolerances even though sheet metal is used for the covers. The thickness of commercial sheet metal varies considerably, but by ironing the aligning portions, such thickness variations are not a problem. Further, by providing only short, spaced apart portions of the top cover, the portions are formed to the proper dimensions by utilizing an inexpensive ironing process. The anchoring part both anchors the plug part of the electrical connector and it protects motor parts against corrosion. The bottom cover further acts as a support for the pressure equalizing mechanism, and both covers form close fits with the outer shell 11.

We claim:

1. An electric motor for operation while submerged in a corrosive liquid and adapted to be connected to drive a mechanism having an aligning surface thereon, comprising a stator, an end bell secured to one end of said stator, said end bell including a plurality of spaced apart aligning means conforming generally to said surface but being undersized relative to said surface, a sheet material cover made of a corrosion-resistant material and covering said end bell, said cover including a plurality of spaced apart preformed aligning means conforming to and having a close fit only with the respective aligning means of said end bell, the overal dimensions of said aligning means of said end bell and said cover having a close fit with said aligning surface of said mechanism and thus accurately locating said mechanism relative to said end bell.

2. An electric motor as in claim 1, wherein said aligning surface of said mechanism comprises a generally circular surface, said aligning means of said end bell and said aligning means of said cover being circumferentially spaced.

3. An electric motor as in claim 1, wherein said stator further includes a cylindrical outer shell of a corrosion-resistant material, a second end bell at the other end of said stator, said stator and said end bells being secured together with one of said end bells at each end of said shell, a rotor rotatably supported by said end bells, and a second cover made of a corrosion-resistant material and extending over the outer surface of said second end bell, each cover further overlapping the adjacent portion of said shell in tight fitting relation.

4. An electric motor as in claim 1, wherein aligned openings are formed in said end bell and said cover for a power input connector, and a sleeve made of a corrosion-resistant material, said sleeve being mounted in said opening in said end bell and protecting the wall of said opening in said end bell.

5. An electric motor as in claim 4, wherein said sleeve is fastened to said end bell, and a part of said connector is connectable to said sleeve.

6. An electric motor as in claim 1, wherein said motor includes a shaft, said end bell and said cover being at the upper end of said motor and having aligned openings formed therein, said shaft extending upwardly through said openings, a sand slinger fastened to said shaft above said cover and having a downwardly turned outer edge portion, and the marginal portion of said cover around said opening being turned upwardly within said outer edge portion of said sand slinger.

7. An electric motor as in claim 1, and further including an opening formed through said end bell, a first electrical connector part fastened to said stator at said opening, said opening being adapted to receive a second connector part which mates with said first part, an opening formed in said cover for said second connector part, and a corrosion-resistant sleeve mounted in said openings and around said connector parts for protecting the wall of the opening in said end bell against corrosion.

8. An electric motor as in claim 7, wherein said sleeve is fastened to said end bell.

9. An electric motor as in claim 8, wherein said end bell has an anchoring groove formed therein, and said sleeve has flanges thereon which are located in said groove to fasten said sleeve to said end bell.

10. An electric motor as in claim 9, wherein said second connector part has an orienting boss thereon, and said sleeve has an orienting groove therein which receives said boss.

11. An electric motor as in claim 7, wherein said cover extends over one face of said end bell and said end bell has a groove formed in the other face thereof, and said sleeve extends through said openings in said end bell and said cover and has at least one flange formed thereon, said flange being located in said groove, whereby said flange and said groove prevent said sleeve turning and also hold said sleeve against movement on its axis.

12. An electric motor as in claim 11, wherein said sleeve has an axial groove formed in the side thereof, said groove being adapted to receive an aligning boss of said second connector part, said flange in said groove of said end bell serving to orient said axial groove relative to said end bell.

13. An electric motor as in claim 12, wherein said groove in said end bell is arcuate and said flange is similarly arcuately shaped.

14. An electric motor as in claim 3, wherein said second end bell has an opening therein, and a pressure equalizing device positioned in said opening and supported by said second cover, said second cover thus serving both to protect said end bell against corrosion and also to support said pressure equalizing device.

15. An electric motor as in claim 3, wherein said second cover has an edge portion extending beyond said end bell and into firm abutting relation with the edge of the adjacent end of said shell.

* * * * *